US008878695B2

(12) United States Patent
Cross

(10) Patent No.: US 8,878,695 B2
(45) Date of Patent: Nov. 4, 2014

(54) SIGNAL LIGHT PRIORITY SYSTEM UTILIZING ESTIMATED TIME OF ARRIVAL

(75) Inventor: Brad Cross, McLeansboro, IL (US)

(73) Assignee: STC, Inc., McLeansboro, IL (US)

( * ) Notice: Subject to any disclaimer, the term of this patent is extended or adjusted under 35 U.S.C. 154(b) by 93 days.

(21) Appl. No.: 13/535,231

(22) Filed: Jun. 27, 2012

(65) Prior Publication Data

US 2012/0326890 A1 Dec. 27, 2012

Related U.S. Application Data

(60) Provisional application No. 61/501,373, filed on Jun. 27, 2011.

(51) Int. Cl.
*G08G 1/07* (2006.01)

(52) U.S. Cl.
CPC ........................................ *C08G 1/087* (2013.01)
USPC ........... 340/906; 340/901; 340/902; 340/903; 340/904; 340/905; 340/928; 340/933; 340/937

(58) Field of Classification Search
USPC .......................... 340/901–906, 928, 933, 937
See application file for complete search history.

(56) References Cited

U.S. PATENT DOCUMENTS

| | | | |
|---|---|---|---|
| 4,914,434 A | 4/1990 | Morgan et al. | |
| 5,539,398 A | 7/1996 | Hall | |
| 5,926,113 A | 7/1999 | Jones et al. | |
| 5,986,575 A | 11/1999 | Jones et al. | |
| 6,243,026 B1 | 6/2001 | Jones | |
| 7,098,806 B2 | 8/2006 | Bachelder | |
| 7,116,245 B1 | 10/2006 | Bachelder | |
| 7,327,280 B2 | 2/2008 | Bachelder | |
| 7,663,505 B2 | 2/2010 | Publicover | |
| 7,751,390 B2 | 7/2010 | Mosko et al. | |
| 7,835,351 B2 | 11/2010 | Mosko et al. | |
| 7,864,071 B2 | 1/2011 | Bachelder et al. | |
| 7,868,783 B2 | 1/2011 | Bachelder | |
| 8,054,202 B1 * | 11/2011 | Sikora et al. | 340/906 |
| 2006/0261977 A1 | 11/2006 | Bachelder | |

FOREIGN PATENT DOCUMENTS

EP 1845503 A2 10/2007

OTHER PUBLICATIONS

International Search Report, International Patent Application No. PCT/US2012/044474, mailed Jan. 7, 2013, 9 pages.

* cited by examiner

*Primary Examiner* — Daryl Pope
(74) *Attorney, Agent, or Firm* — Lewis, Rice & Fingersh L.C.

(57) ABSTRACT

Systems and methods for requesting modification of traffic flow control systems that combine satellite position navigation systems and dead reckoning technology with secure radio communications to accurately report a vehicle's real-time location and estimated arrival times at a series of signal lights within a traffic grid or at a distant signal light, while enabling signal controllers to accommodate priority requests from these vehicles, allowing for these vehicles to maintain a fixed schedule with minimal interruption to other grid traffic.

12 Claims, 11 Drawing Sheets

SIGNAL LIGHT PRIORITY SYSTEM UTILIZING ESTIMATED TIME OF ARRIVAL

CROSS REFERENCE TO RELATED APPLICATION(S)

This Application claims the benefit of U.S. Provisional Patent Application Ser. No. 61/501,373, filed Jun. 27, 2011, the entire disclosure of which is incorporated herein by reference.

BACKGROUND OF THE INVENTION

1. Field of the Invention

This disclosure is related to the field of systems for the management of traffic flow through the controlling of signal lights and monitoring the location of vehicles within a traffic grid.

2. Description of Related Art

In the perfect commuter utopia, signal lights would automatically switch to green every time a driver's vehicle approached an intersection, creating an unobstructed pathway towards the driver's final destination. In real life though, hitting a red light is a normal and inevitable part of any driver's commute. With the growth of modern cities and the reliance of much of the population on mass transit and personal automobiles for transportation, efficient control of the ebb and flow of traffic through efficient and smart signal light control and coordination systems has become increasingly important.

There are many substantial benefits to be reaped from improved traffic flow for personal, mass transit, and emergency motor vehicles. For many commuters, reclaiming part of their day would enhance their quality of life. Further, less congestion on the roads would generate fewer accidents, thereby saving lives. Moreover, traffic delays impinge on productivity and economic efficiency—time spent traveling to and from work is not time spent doing work. Further, many goods must be transported and many service providers must travel to their clients. Traffic delays all of these economic production factors. There is also a concern regarding the increased pollution that results from stop-and-go traffic flow in contrast to smooth flowing traffic. Further, longer commutes means longer running times and entails more greenhouse gases. Also, congested traffic and uncoordinated signal lights can cause delays in the mass transit system which, if not remedied, can throw off an entire mass transit schedule grid and disincentivise individuals from using mass transit systems. For example, it has been demonstrated that schedule adherence for mass transit vehicles results in an increase in ridership. Lastly, the importance of prioritizing and efficiently moving emergency vehicles through traffic lights is axiomatic.

Currently, a variety of different control and coordination systems are utilized to ensure the smooth and safe management of traffic flows. One commonly utilized mechanism is the traffic controller system. In this system, the timing of a particular signal light is controlled by a traffic controller located inside a cabinet which is at a close proximity to the signal light. Generally, the traffic controller cabinet contains a power panel (to distribute electrical power in the cabinet); a detector interface panel (to connect to loop detectors and other detectors); detector amplifiers; a controller; a conflict motor unit; flash transfer relays; and a police panel (to allow the police to disable and control the signal), amongst other components.

Traffic controller cabinets generally operate on the concept of phases or directions of movement grouped together. For example, a simple four-way intersection will have two phases: North/South and East/West; a four-way intersection with independent control for each direction and each left hand turn will have eight phases. Controllers also generally operate on the concept of rings or different arrays of independent timing sequences. For example, in a dual ring controller, opposing left-turn arrows may turn red independently, depending on the amount of traffic. Thus, a typical controller is an eight-phase, dual ring controller.

The currently utilized control and coordination systems for the typical signal light range from simple clocked timing mechanisms to sophisticated computerized control and coordination systems that self-adjust to minimize the delay to individuals utilizing the roadways.

The simplest control system currently utilized is a timer system. In this system, each phase lasts for a specific duration until the next phase change occurs. Generally, this specific timed pattern will repeat itself regardless of the current traffic flows or the location of a priority vehicle within the traffic grid. While this type of control mechanism can be effective in one-way grids where it is often possible to coordinate signal lights to the posted speed limit, this control mechanism is not advantageous when the signal timing of the intersection would benefit from being adapted to the changing flows of traffic throughout the day.

Dynamic signals, also known as actuated signals, are programmed to adjust their timing and phasing to meet the changing ebb and flow in traffic patterns throughout the day. Generally, dynamic traffic control systems use input from detectors to adjust signal timing and phasing. Detectors are devices that use sensors to inform the controller processor whether vehicles or other road users are present. The signal control mechanism at a given light can utilize the input it receives from the detectors to adequately adjust the length and timing of the phases in accordance with the current traffic volumes and flows. The currently utilized detectors can generally be placed into three main classes: in-pavement detectors, non-intrusive detectors, and detectors for non-motorized road users.

In-pavement detectors are detectors that are located in or underneath the roadway. These detectors typically function similarly to metal detectors or weight detectors, utilizing the metal content or the weight of a vehicle as a trigger to detect the presence of traffic waiting at the light and, thus, can reduce the time period that a green signal is given to an empty road and increase the time period that a green signal is given to a busy throughway during rush hour. Non-intrusive detectors include video image processors, sensors that use electromagnetic waves or acoustic sensors that detect the presence of vehicles at the intersection waiting for the right of way from a location generally over the roadway. Some models of these non-intrusive detectors have the benefit of being able to sense the presence of vehicles or traffic in a general area or virtual detection zone preceding the intersection. Vehicle detection in these zones can have an impact on the timing of the phases. Finally, non-motorized user detectors include demand buttons and specifically tuned detectors for detecting pedestrians, bicyclists and equestrians.

Above and beyond detectors for individual signal lights, coordinated systems that string together and control the timing of multiple signal lights are advantageous in the control of traffic flow. Generally, coordinated systems are controlled from a master controller and are set up so that lights cascade in sequence, thereby allowing a group or "platoon" of vehicles to proceed through a continuous series of green lights. Accordingly, these coordinated systems make it possible for drivers to travel long distances without encountering a red light. Generally, on one-way streets this coordination can be accomplished with fairly constant levels of traffic. Two-way streets are more complicated, but often end up being arranged to correspond with rush hours to allow longer green light times for the heavier volume direction. The most technologically advanced coordinated systems control a series of city-wide signal lights through a centrally controlled system that allows for the signal lights to be coordinated in real-time through above-ground sensors that can sense the levels of traffic approaching and leaving a virtual detection zone which precedes a particular intersection.

While cascading or synchronized central control systems are an improvement on the traditional timer controlled systems, they still have their drawbacks. Namely, priority vehicles in these systems are only able to interact with a virtual detection zone immediately preceding a particular intersection; there is no real-time monitoring of the traffic flows preceding or following this virtual detection zone across a grid of multiple signal lights. Stated differently, there is no real-time monitoring of how a vehicle or a group of vehicles travels through a traffic grid as a whole (i.e., approaching, traveling through and leaving intersections along with a vehicle's transit between intersections). Accordingly, these systems can provide for a priority vehicle, such as an emergency vehicle, to be accelerated through a particular signal at the expense of other vehicles, but they lack the capability to adapt and adjust traffic flows to keep a mass transit vehicle, or similar time scheduled vehicle, on time or adjust the lights in front of a mass transit vehicle to get it back on schedule. Virtual detection zone based systems only have the capability for control of a particular signal light to accelerate the movement of a single vehicle or a group of vehicles approaching that signal directly; they cannot offer an integrated control system with the capability of controlling the phases of multiple signal lights in a grid system, altering the length of particular phases at particular signal lights within the grid system to accommodate a particular vehicle traveling through the grid system according to a relatively fixed path and schedule.

Another problem with virtual detection zone based systems is their disruption of the overall traffic flow of the grid. As noted previously, detection zone based systems are focused on individual signal lights. If a priority vehicle is sensed in the virtual detection zone, the immediately upcoming light will either change to green to give the priority vehicle the right-of-way and potentially disrupt the entire system (something logical for allowing rapid passage of an emergency vehicle) or will not because the vehicle lacks sufficient priority to disrupt the system (as can be the case with a mass transit vehicle) simply to beat the next signal.

What detection zone based systems fail to take into account is the impact this immediate change in an immediately approached signal light phase, irrespective of other traffic at the light, has on the overall traffic flows of the grid as a whole. Thus, while aiding in getting a particular priority vehicle through an intersection, these systems can, on a broader basis, add to rather than decrease the traffic levels in a given area at a given time. Further, because of their focus on a single signal light and vehicles approaching a single signal light, these systems are generally incapable of adjusting a series of lights within the traffic grid based upon a vehicle's current position, speed, schedule and path of travel.

Another frequent traffic problem which cannot be addressed by these commonly utilized virtual detection zone based systems is mass transit vehicle bunching, also known as bus bunching, clumping or platooning. Bunching refers to a group of two or more transit vehicles along the same route, which are scheduled to be evenly spaced, such as buses, catching up with each other and, thus, running in the same location at the same time. Generally, bunching occurs when at least one of the vehicles is unable to keep to its schedule and therefore ends up in the same location as one or more other vehicles on the same route. Thus, the lead mass transit vehicle in the bunch typically slows to pick up passengers that would otherwise be boarding the trailing mass transit vehicle. This leads to overcrowding and further slowing of the lead vehicle. Conversely, the trailing mass transit vehicle encounters fewer passengers and, soon, both mass transit vehicles are in full view of each other—to the dismay of passengers on the overcrowded and behind schedule vehicles. It is no surprise that bunching is a leading complaint of regular transit riders and a headache for those operating and managing transit services. The currently utilized detection zone based systems—with their control methodology localized to individual lights—are simply incapable of controlling or preventing bunching.

Another failing of the currently utilized detection zone based systems is their inability to modify the conditions under which a vehicle may request priority. For example, under many of these currently utilized systems, priority is given to any flagged vehicle that enters a detection zone and is sensed by a detector (such as an in-pavement detector). These systems are generally incapable of granting priority on a more nuanced and conditional basis such as only granting priority when another mass transit vehicle has not requested priority within a specified time frame or only granting priority when an exit request has not been made for the next stop.

Thus, there is a need in the art of traffic flow management for a system that is capable of controlling and adjusting signal lights based on the movement, position and proposed schedules of one or more tracked vehicles within a traffic grid.

SUMMARY OF THE INVENTION

Because of these and other problems in the art, described herein, among other things, are methods and systems for requesting modification of traffic flow control systems wherein a vehicle's real-time location and estimated time of arrival (ETA) is utilized to modify the priority management cycles of multiple traffic lights in a traffic grid to assist a given vehicle in arriving at a predetermined destination on a predetermined time schedule.

DESCRIPTION OF THE PREFERRED EMBODIMENTS

This disclosure is intended to teach by way of example and not by way of limitation. As a preliminary matter, it should be noted that while the description of various embodiments of the disclosed system will discuss the movement of mass transit vehicles (such as, but not limited to, buses, light rail trains, and street cars) through signal lights, this in no way limits the application of the disclosed traffic control system to use in mass transit systems. Any vehicle which could benefit from the ETA traffic control system described herein is contemplated. For example, it is contemplated that the system could be applied to and utilized by taxis, first responders, emergency vehicles, snow plows and waste management vehicles.

In a broad sense, the ETA traffic control system combines satellite position navigation systems and dead reckoning technology with secure radio communications to accurately report a vehicle's real-time location and estimated arrival times at a series of signal lights within a traffic grid or at a distant signal light (e.g., one which is not the immediate next light that will be encountered), while enabling signal controllers to accommodate priority requests from these vehicles, allowing for these vehicles to maintain a fixed schedule with minimal interruption to other grid traffic. The ETA system disclosed herein also allows for the display of maps of vehicle and intersection activity on centrally-located monitors or in a vehicle in real-time and for the creation of detailed logs and reports of traffic flow patterns and activity in real-time for monitoring personnel. Thus, the system utilizes the Global Positioning System (GPS), or similar technology, and secure radio communication to enable transit vehicles to report location and activity data to traffic controllers and/or central locations in real time. Further, the system enables dispatchers or other monitoring personnel at a centralized or secondary remote location to see the time/distance between equipped vehicles in the traffic grid. The system also allows for the generation and sending of automatic or manual alerts to notify vehicle operators of changes in route status.

The ETA traffic control system described herein is generally structured as follows. In its basic form, the hardware components of the system include a vehicle equipment unit/vehicle computer unit (VCU) installed in vehicles and a priority detector installed in or near signal control cabinets (along with a cabinet- or pole-mounted antenna). As will be described further herein, the basic hardware components of the system (generally the VCU and the priority detector) generally communicate wirelessly using secure frequency hopping spread spectrum radio. The mobile-vehicle mounted hardware components, such as the VCU, utilize GPS or other known positioning technology to determine the precise real-time location of the VCU and the vehicle to which it is attached at all times.

Figure 5:
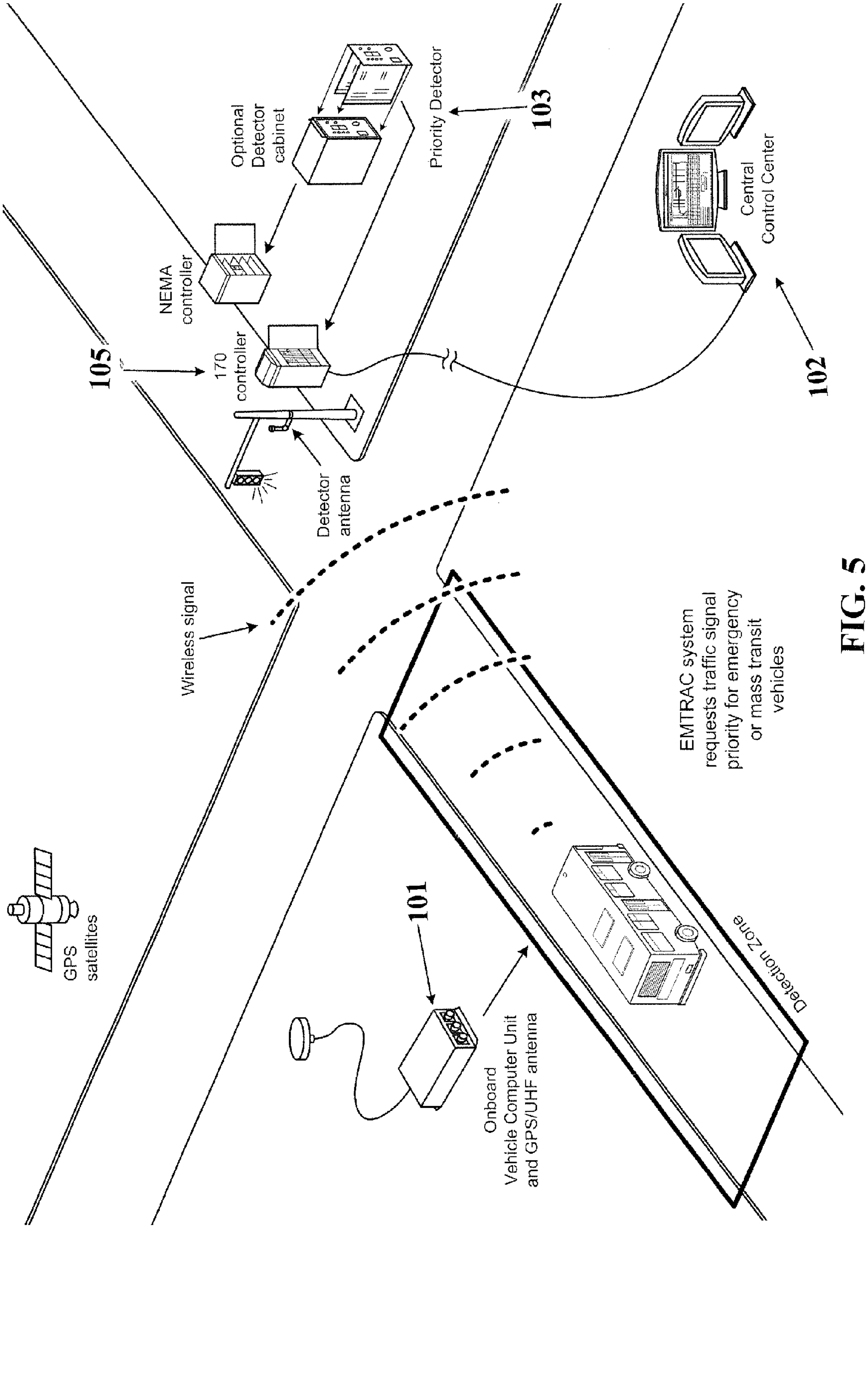
FIG. 5 provides a perspective view of the disclosed ETA priority system from a street-view perspective in an embodiment in which the system has a centralized server.

As demonstrated in a street-view of an embodiment of the system provided in FIG. 5, the VCU (101) is installed in a monitored vehicle in the traffic grid. As noted previously, contemplated monitored vehicles include, but are not limited to, mass transit vehicles (buses, trains, light rail, etc.), emergency vehicles (fire tricks, police cars, ambulances, etc.), waste management vehicles, and road maintenance vehicles. It should be understood that the system disclosed herein contemplates the installation of one or more VCUs in various vehicles traveling and operating in the traffic grid.

Generally, the VCU (101) serves several functions in the disclosed traffic control system. The VCU (101) determines the real-time location data for the vehicle in which it is installed. This data includes the vehicle's velocity and coordinates. In certain embodiments, the VCU (101) will also include a map of the traffic grid and the map and schedule of the mass transit vehicle in which it is installed, along with other mass transit vehicles in the grid. In these embodiments, the VCU (101) will also have the capability of calculating and determining the vehicle's ETA at a future location and whether or not the vehicle is on schedule. The VCU (101) also is capable of sending information regarding its velocity, location and ETA to other components of the system to which it is communicatively attached, including a remote traffic control center (102), a plurality of secondary control centers (106), a plurality of other VCUs (101), and a plurality of priority detector units (103). In addition, the VCU (101) is also capable of receiving information from these other components in the system. In sum, the VCU (101) functions to determine the velocity and location of its attached vehicle in the overall traffic grid, transmits this information or utilizes it to determine the vehicle's ETA to a predetermined point (and tangentially, whether it is on or off schedule) and transmits and receives information regarding the position of the vehicle within the traffic grid to other component parts of the system.

One contemplated component part of the VCU (101) is a receiver for a satellite positioning navigation system. Generally, any satellite positioning system known to one of ordinary skill in the art is contemplated including, but not limited to, the GPS, the Russian Global Navigation Satellite System (GLONASS), the Chinese Compass navigation system and the European Union's Galileo positioning system. Further, any receiver technology known to those of skill in the art that is able to calculate its real-time position by precisely timing the signals sent by satellites, or by any other methodology known to those of ordinary skill in the art, is a contemplated receiver in the disclosed system. The installation of the receiver can be either permanent, by direct integration into the vehicle, or temporary, through a mobile receiver that can be taken into and removed from the vehicle. Generally, the receiver of the VCU (101) functions to determine the vehicle's position, direction and velocity in real-time at any given point during its travels. In alternative embodiments, it is contemplated that the VCU (101) will determine its position, direction and velocity through internal navigation systems known to those of ordinary skill in the art alternatively, or in addition to, satellite positioning driven systems. Contemplated internal navigation systems include, but are not limited to, gyroscopic instruments, wheel rotation devices, accelerometers, and radio navigation systems.

In addition to a receiver, the VCU (101) also generally contains a vehicle computer which is capable of transferring the location data, coordinates and speed of the vehicle to the other networked components of the system. Another contemplated component of the VCU (101) is a radio transceiver. Generally, any device for the transmission and receiving of radio signals including but not limited to the FHSS and/or FH-CDMA methods of transmitting radio signals is contemplated.

Notably, throughout this disclosure, the term "computer" will be used to describe hardware which implements functionality of various systems. The term "computer" is not intended to be limited to any type of computing device but is intended to be inclusive of all computational devices including, but not limited to, processing devices or processors, personal computers, work stations, servers, clients, portable computers, and hand held computers. Further, each computer discussed herein is necessarily an abstraction of a single machine. It is known to those of ordinary skill in the art that the functionality of any single computer may be spread across a number of individual machines. Therefore, a computer, as used herein, can refer both to a single standalone machine, or to a number of integrated (e.g., networked) machines which work together to perform the actions. In this way, the functionality of the computer of the VCU (101) may be at a single computer, or may be a network whereby the functions are distributed. Further, generally any wireless methodology for transferring the location data created by the VCU (101) to the other component parts of the system to which it is communicatively networked is contemplated. Thus, contemplated wireless technologies include, but are not limited to, telemetry control, radio frequency communication, microwave communication, GPS and infrared short-range communication.

Another component of the VCU (101), in certain embodiments, is a combination GPS/UHF antenna. In the embodiment with the combination antenna, the combo GPS/UHF antenna contains the antennas for both the transceiver and the GPS unit. Notably, however, this combo antenna is not required and in other embodiments two separate antennas can be utilized. Generally, the combo antenna or separate antennas will be mounted on the top of the priority vehicle, although this location is not determinative. Further, in certain embodiments, the antenna will be connected to the VCU (101) by two coax cable connections (one for UHF and one for GPS), although any method for connecting the antenna(s) to the VCU (101) (including both wired and wireless technologies) is contemplated.

Generally the VCU (101) will be programmed with preferred vehicle response settings, applicable intersections, the vehicle's schedule, a map of the overall grid, and vehicle detection zones for applicable signal lights in the grid. In certain embodiments, it is contemplated that the VCU will include a user interface known to those of ordinary skill in the art. Among other things, this user interface will provide a view of the map of the overall grid, vehicle detection zones for applicable signal lights in the grid, and the location of other VCU-equipped vehicles in the grid.

In one embodiment, the VCU (101) will be powered directly by the vehicle battery. For example, in one contemplated embodiment, the VCU (101) will be powered directly by 12 VDC from the vehicle battery. In other embodiments, the VCU (101) will be powered by a portable power unit known to those of skill in the art including, but not limited to, batteries and solar panels.

A second component of the traffic control system described herein is a plurality of priority detector units (103). The priority detector units (103) of the disclosed traffic control system generally function to modify and control the associated signal light based upon the velocity, location, coordinates, ETA and priority signals of VCU-equipped vehicles in the traffic grid. Generally, the priority detector units (103) receive ETA notifications from VCU-equipped vehicles in the grid and precondition their timing signals to the signal controller (105) based upon a VCU-equipped vehicle's arrival at the intersection. Receipt of advanced signals from VCU-equipped vehicles in the grid helps the controller gradually modify the timings of the signal light to reduce the impact on the intersection while also enabling the intersection to maintain coordination with other intersections along the corridor.

The priority detector units (103) will generally be located at or near particular traffic light signals and signal controllers (105) in the area controlled by the disclosed system. In one embodiment, each priority detector unit (103) will be co-located within a particular signal light controller (105) cabinet. However, this location is not determinative. It is contemplated that the priority detector unit (103) may be located at any proximity near a particular signal light that allows the priority detector unit (103) to receive applicable signals from the remote traffic control center (102), secondary control centers (106), other priority detector units (103) and/or the VCUs (101) and allows the priority detector (103) to send calls to the signal controller (105) to modify the phases of the respective signal light that it monitors.

One component of the priority detector units (103) is the intersection antenna (201). This antenna (201) is any antenna known to those of skill in the art that is capable of receiving radio or other electromagnetic signals. In one embodiment, the antenna will be co-located with the priority detector (103). In other embodiments, the antenna will be located at a position removed from the priority detector (103). Generally, it is contemplated that the intersection antenna (201) may be located at any place near the applicable intersection that would allow for the effective transmission and receipt of signals. For example, in certain embodiments it is contemplated that the intersection antenna (201) will be externally mounted on a signal light pole at the intersection. In one embodiment, the intersection antenna (201) will be connected to the priority detector unit (103) by wire connections, in one embodiment by two coax cable connections (e.g., for UHF and GPS). In another embodiment, the intersection antenna (201) will be connected wirelessly to the priority detector unit (103) in a manner known to those of ordinary skill in the art.

Further, different embodiments of the priority detector unit (103) include a shelf-mount version or a rack-mount version. In one embodiment of the rack-mount version, is it contemplated that the priority detector unit (103) will be able to be inserted directly into two adjoining card slots of a NEMA detector rack or Model 170 card file. However, it should be noted that any priority detector unit (103) design known to one of ordinary skill in the art that is able to perform the functionality described in this application is contemplated.

The priority detector unit (103) will generally send a variety of outputs using the standard North, South, East and West discreet outputs for a signal controller (105) based on information regarding a vehicle's geographical zone position, velocity and ETA, among other logistical information received from the VCUs (101), remote traffic control system (102), and/or secondary control centers (106).

In one embodiment, the priority detector unit (103) will control multiple geographical or virtual zones for a single light. For example, it may have a different zone pertaining to a light rail track, an in-street bus line, and a standard road signal even though all the various zones partially or totally overlap in a geographic sense. Generally, this standard output sent by the priority detector unit (103) (e.g., turn the Northbound light green) will be held until the vehicle leaves the detection zone. The priority detector units (103), in certain embodiments, generally will use auxiliary outputs (e.g., AUX1, AUX2, and AUX3) to communicate this standard output to the signal controller (105). However, any mode known to those of ordinary skill in the art for communicating the output signals from the priority detector unit (103) to the signal controller (105) is contemplated in this application. Further, in certain embodiments, a binary ETA status is applied to these three auxiliary outputs to designate the current ETA status of an approaching VCU-equipped vehicle. In certain embodiments, some status outputs will be held for one second, whereas other status updates will be held until the VCU-equipped vehicle checks out of the geographic detection zone.

Another component of the ETA traffic control system also generally located in the traffic control cabinet in certain embodiments is a high-speed data adapter. The high speed adaptor assists in the communication of output signals between the priority detector (103) and the signal controller (105). While any high-speed adapter known to one of ordinary skill in the art is contemplated, in one embodiment it is contemplated that the adaptor can use RS232, SDLC, Ethernet or other protocols to receive and output the large number of signals (such as ETA calls for each direction) from the priority detector (103) to the signal controller (105).

Generally, the priority detector unit (103) of the ETA traffic control system is capable of sending a variety of output calls to the signal controller (105) with which it is associated. Examples of contemplated calls include, but are not limited to, cancel calls, checkout calls, emergency vehicle priority (EVP) calls, transit signal priority (TSP) (0-3) calls and EVP threshold calls. Each of these calls controls or in some way modifies the functioning and operation of the signal controller (105) based upon the speed, location, ETA or other data received from VCU-equipped vehicles in the traffic grid. Generally a "cancel" call is a call output issued when the priority detector unit (103) is notified by the VCU (101) that the vehicle has gone into standby mode. For example, mass transit vehicles may be configured to enter standby mode when a stop is requested or when the doors open. In such situation, the vehicle has no need of any priority as it is no longer traveling towards the intersection. A "checkout" call is generally an output issued when the vehicle leaves the intersection approach zone. It is at this point that the vehicle has generally either arrived at the intersection or turned off the approach and therefore would no longer be affected by the relevant signal light(s). EVP calls are output calls issued when an equipped emergency vehicle enters the detection zone. The TSP (0-3) calls are the outputs issued at the intervals defined in the threshold TSP fields. The threshold TSP fields are various advanced detection zones preceding the signal light (such as zones A4-A1 in FIG. 1 or zones Z4-Z1 in FIG. 11) at which a VCU-equipped vehicle transmits its ETA to an applicable priority detector or other networked component of the system. Finally, the EVP threshold is the maximum number of seconds at which EVP requests should be sent to the signal controller (105). For an example, a "200" in this field would not allow EVP calls to be sent by the priority detector unit (103) to the signal controller (105) until the vehicle is no more than 200 seconds from the intersection. This keeps a light from changing too early to accommodate an emergency vehicle and being overly disruptive of traffic and possibly resulting in other driver's ignoring their red light in frustration.

Figure 6:
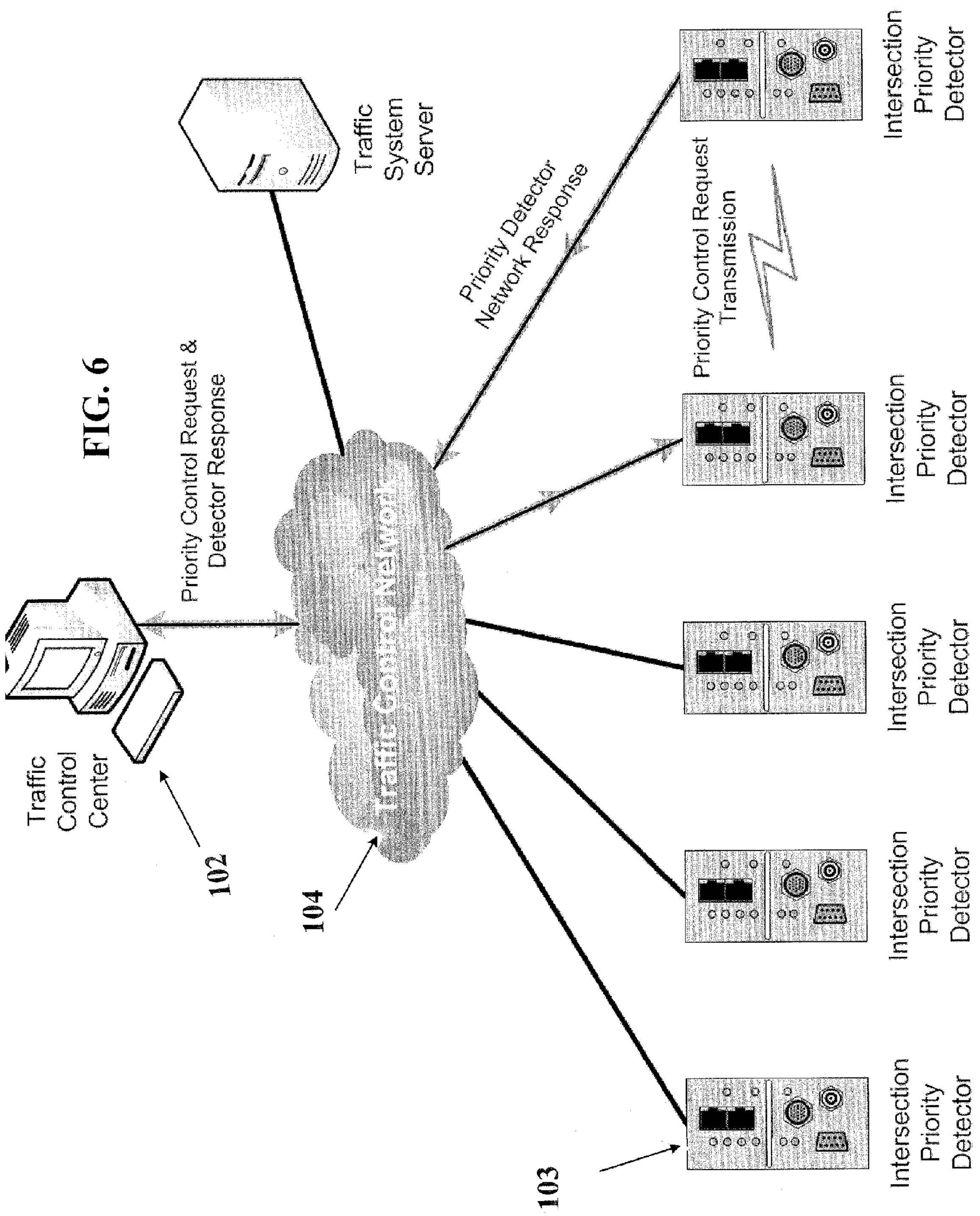
FIG. 6 provides a communication diagram of how the ETA traffic components interface through the traffic control network of the disclosed ETA priority system in an embodiment in which the system has a centralized server.
Figure 7:
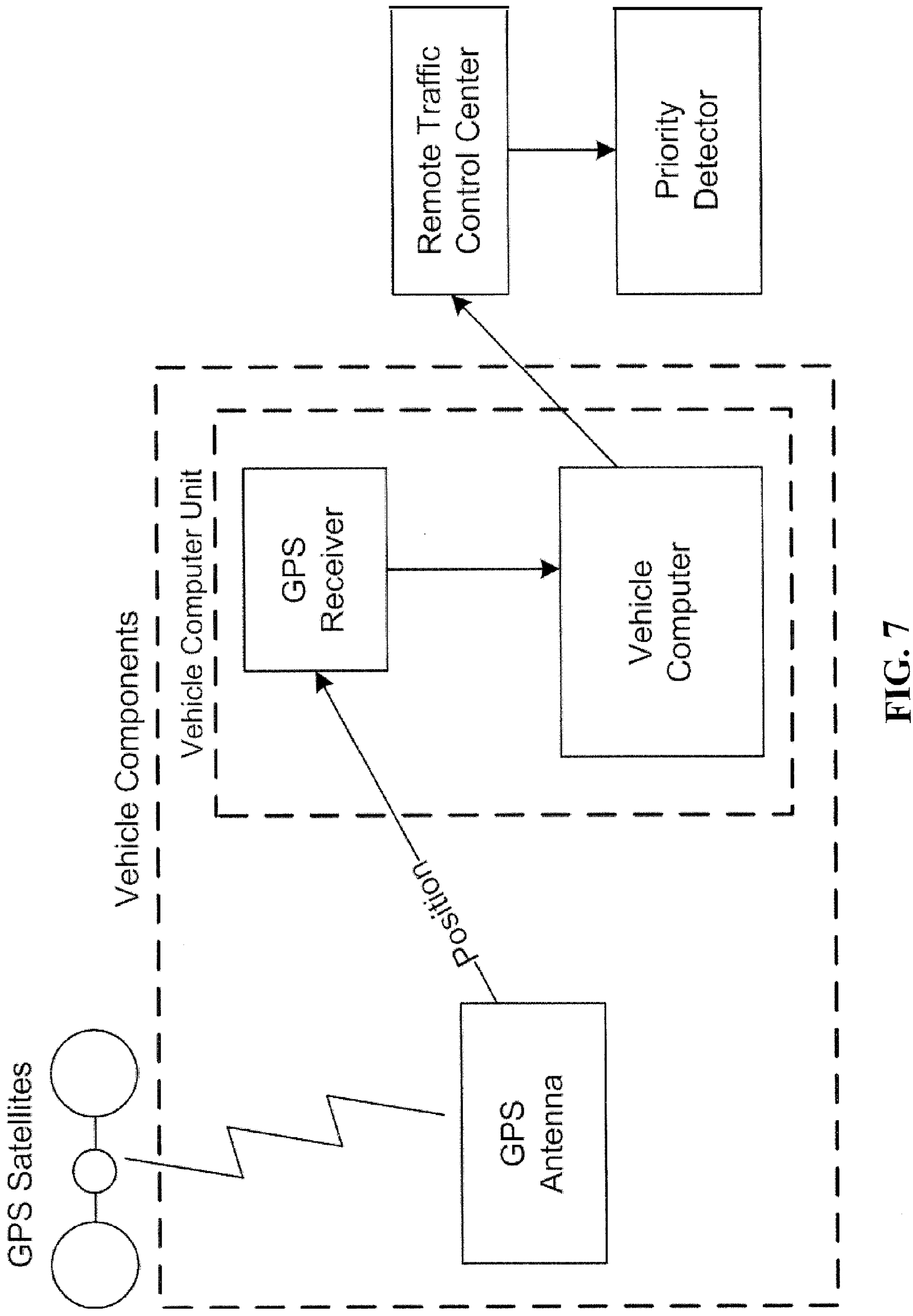
FIG. 7 provides a block diagram of the components of the disclosed traffic light ETA priority system in an embodiment in which the system has a centralized server.
Figure 10:
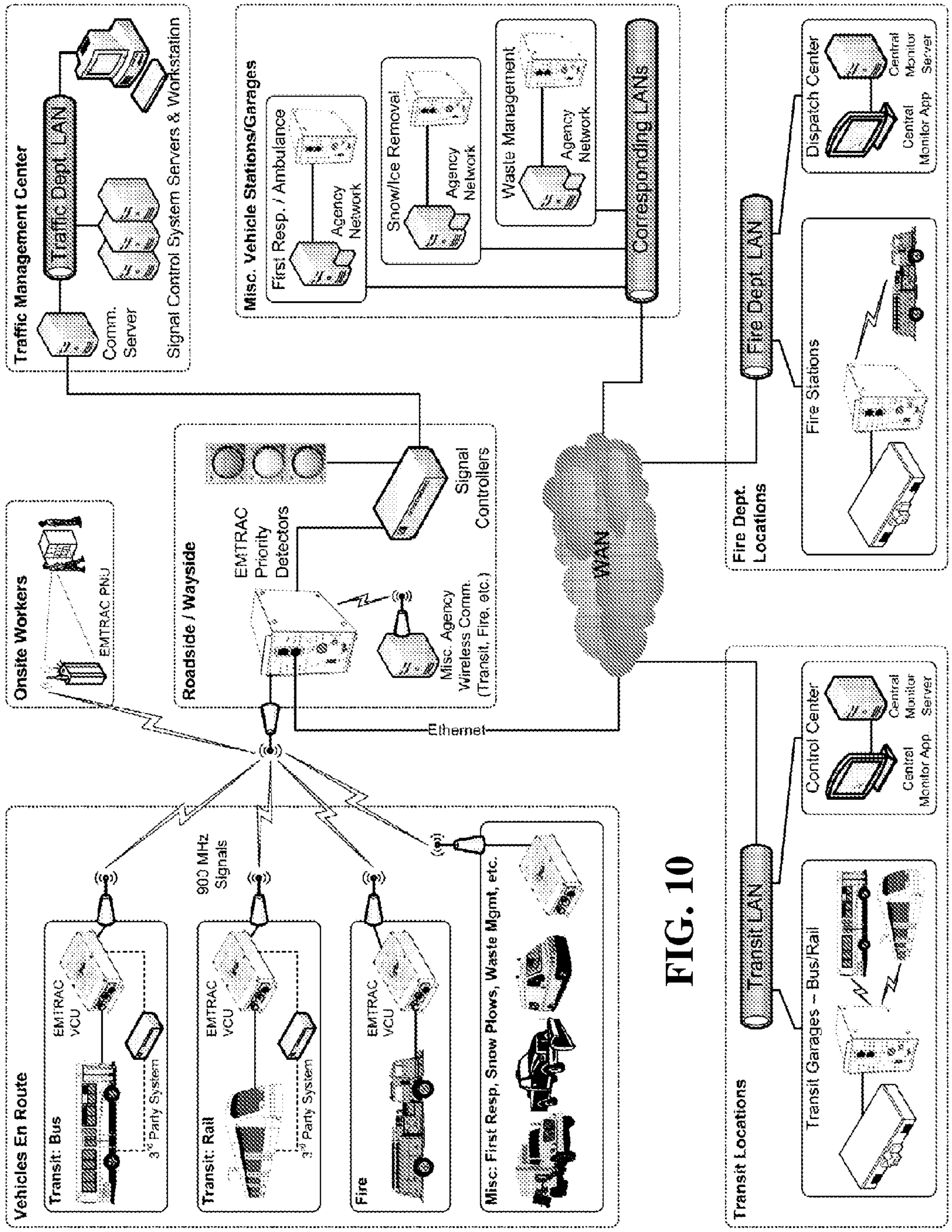
FIG. 10 provides a communication diagram of an embodiment of the disclosed ETA priority system.

Generally, the VCUs (101) and priority detector units (103) of the ETA traffic control system will be connected by a wireless technology known to those of skill in the art that allows for the free transfer of data and information between each of these components through a traffic control network (104). One embodiment of this ETA traffic control network (104) is provided in FIG. 6. The network (104) communicatively connects the different components of the system. In the embodiment depicted in FIG. 6, the network (104) connects a plurality of intersection priority detectors (103), the signal light controllers (105) located in the grid (also referred to as the traffic system servers) and the remote traffic control center (102). In other contemplated embodiments, as depicted in FIG. 10, the traffic control network (104) communicatively connects a plurality of components in the system, as will be discussed in more detail later in this application.

In one embodiment of the ETA traffic control system, the actual control of the intersection continues to be performed by the particular signal light controllers (105) located at each respective traffic light in the controlled system; the present ETA traffic control system simply offers new inputs to the signal light controllers (105) regarding the timing and phase changes of each respective traffic signal light in the system in order to accommodate VCU-equipped vehicles and attempt to keep them on schedule.

In an embodiment of the ETA traffic control system in which a centralized control server is utilized, another component of the traffic control system is the remote traffic control center (102). Generally, the remote traffic control center (102) is a central server; i.e. a computer or series of computers that links other computers or electronic devices together. Any known combination or orientation of server hardware and server operating systems known to those of skill in the art for servers is contemplated as the remote traffic control center (102). As detailed more fully later in this application, in the centralized server embodiment of the system the remote traffic control center (102) is linked to the VCUs (101) and the priority detector units (103) of the system by a wireless network that allows for the free transmission of information and data therebetween allowing centralized control of a number of signals. Thus, the system of this embodiment can control signals that may be unrelated to the path taken by the vehicle while still accommodating the vehicle's passage. In other embodiments of the ETA traffic control system in which a centralized control server is utilized, the system will consist of a remote traffic control center (102) and a plurality of secondary control centers (106). It is contemplated that these secondary control centers (106) will be located at control or dispatch centers associated with the VCU-equipped vehicles operating in the traffic grid. Such locations include, but are not limited to, transit operation locations, fire departments, police stations, first responder/ambulance stations, snow/ice removal vehicle stations and waste removal management stations. Similar to the remote traffic control center (102), it should be understood that the secondary control centers (106) generally comprise a server and that any known combination or orientation of server hardware and server operating systems known to those of ordinary skill in the art for servers is contemplated. An embodiment of the ETA traffic control system with a remote traffic control center (102) and a plurality of secondary control centers (106) connected to the rest of the system by a network (104) is provided in FIG. 10.

In a broad sense, the ETA traffic control system disclosed herein, whether in the centralized server embodiment or the localized embodiment, is generally capable of reporting a vehicle's real-time location and ETA to a given location using fixed geographic detection, variable time-point-based detection or a combination of both mechanisms. Further, in additional embodiments, the system can be structured and customized to allow for timing changes or pre-conditions that must be satisfied before signal priority is granted to a vehicle.

Figure 1:
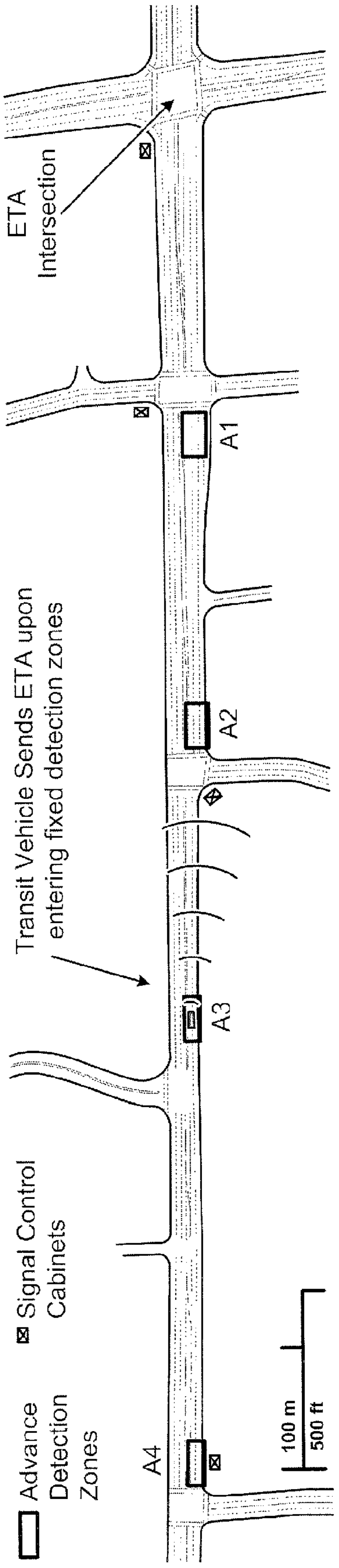
FIG. 1 provides a diagram of an embodiment of the fixed geographic detection method of the ETA priority system.

In a fixed geographic detection method, the ETA traffic control system utilizes a satellite positioning navigation system, such as GPS, to create virtual "loops" that are set up at specific defined points along a vehicle's route. A series of these virtual loops or advanced detection zones leading to a particular ETA intersection are depicted in FIG. 1. As vehicles equipped with a VCU (101) enter and pass through these zones (labeled A4-A1 in FIG. 1), they place ETA calls to the appropriate priority detector units (103) (or central server (102) in the centralized embodiment). For example, in the embodiment depicted in FIG. 1, the VCU (101) would place ETA calls to the priority detector unit (103) associated with the ETA intersection when the vehicle entered each of the fixed detection zones preceding the ETA intersection; i.e., advanced detection zones A4, A3, A2 and A1. Thus, in one embodiment, the VCU-equipped vehicle would transmit a signal of its ETA (or simply its coordinates) to a given intersection to the priority detector unit (103) associated with that intersection upon reaching detection zones A4, A3, A2, and A1. The priority detector unit (103) will then send an output signal to the signal controller (105) for the ETA intersection as necessary to modify the light to keep the VCU-equipped vehicle on schedule. In embodiments in which the system is centralized, the VCU-equipped vehicle will send a signal of its ETA (or simply its coordinates) upon hitting the detection zones A4, A3, A2, and A1 to the priority detector unit (103) for the intersection and/or the remote traffic control center (102). Notably, in this method, the detection zone locations and configurations can be edited on the fly by administration of the system—i.e., the location of A4, A3, A2, and A1 can be modified by a user interfacing with the system at either a VCU (101) or a central (102) or secondary control center (106). Basically, in this method, the location of the vehicle is fixed at transmission, and the transmission records to the expected time to arrival are based on speed and related factors of the vehicle.

Figure 2:
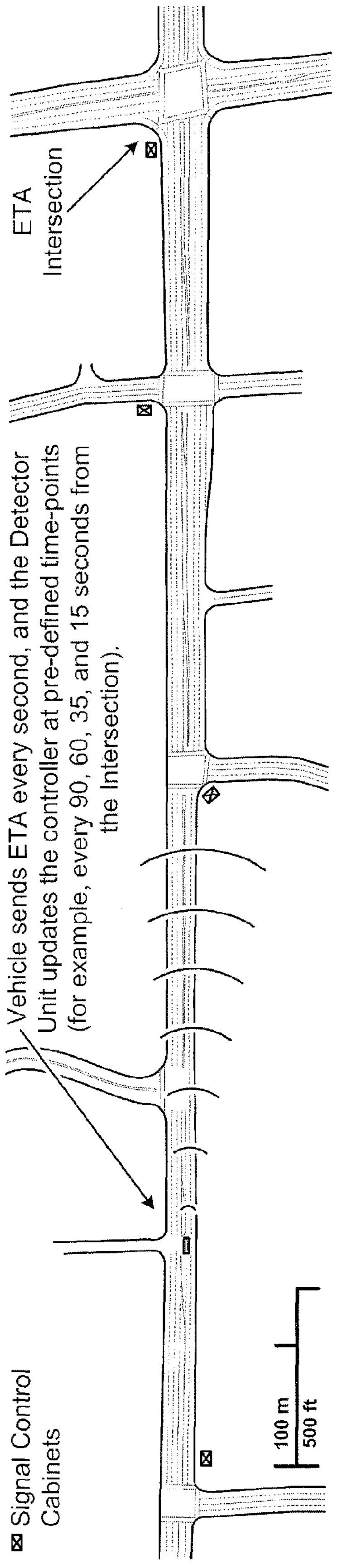
FIG. 2 provides a diagram of an embodiment of the timepoint detection method of the ETA priority system.

In the time-point detection method, a calculated ETA is used to determine when advance communications and priority requests are sent. In this method, the VCU (101) located within the priority vehicle calculates the vehicle's time-distance from a selected intersection (or other pre-defined location in the grid) and transmits that amount (or simply its coordinates) to the appropriate priority detector unit (103) (or central server (102) in the centralized embodiment) along with its position. In one embodiment, the transmission from the VCU (101) to the priority detector unit (103) (or the remote traffic control server (102) in the centralized embodiment) occurs once per second, however any time/signal allocation is contemplated. FIG. 2 provides a depiction of the time-point detection method. As demonstrated in FIG. 2, the VCU-equipped vehicle will send its ETA (or simply its coordinates) to the ETA intersection priority detector (103) (or the remote traffic control center (102) in the centralized embodiment) every second. The priority detector unit (103) will then send an updating output of the vehicle's ETA to the signal controller (105) at pre-defined intervals (such as every 90, 60, 35 and 15 seconds from the vehicle's ETA).

Figure 11:
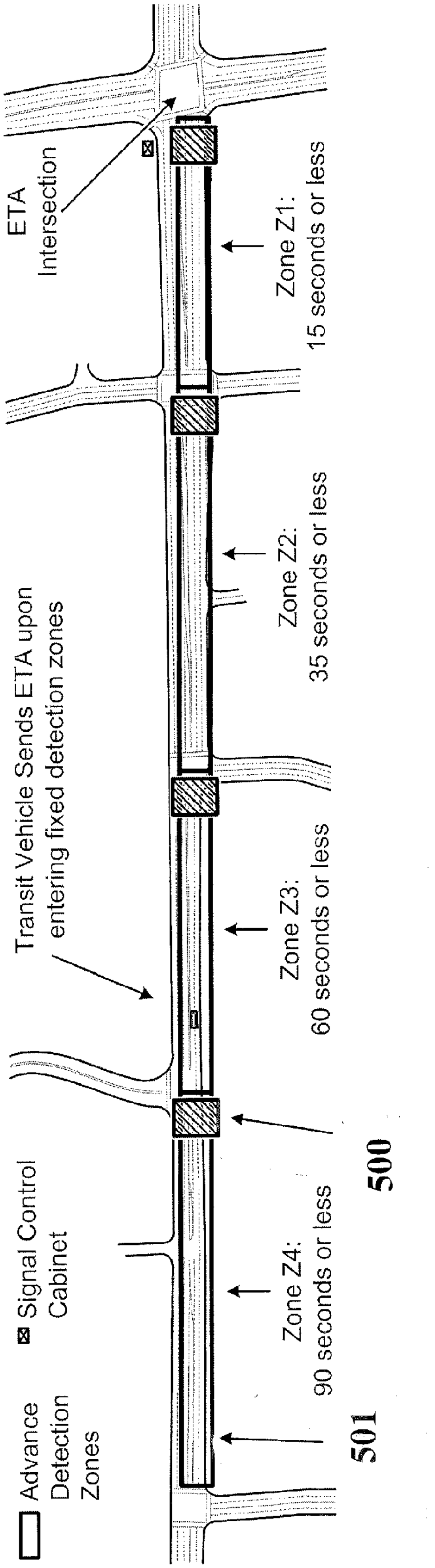
FIG. 11 provides a diagram of the hybrid fixed geographic detection method and time point detection method of the disclosed ETA priority system.

In the hybrid fixed geographic/time point detection method, both a mass transit vehicle's calculated ETA and the mass transit vehicle's current location within the approach zone to a particular intersection is used to determine when advanced communications and priority requests are sent. FIG. 11 offers a depiction of this hybrid method. As demonstrated in FIG. 11, in this method the approach zone leading up to a selected intersection (or pre-defined location within the traffic grid) is divided into a series of one or more fixed geographic zones. For example, in the approach zone depicted in FIG. 11, the approach zone is divided into four (4) zones (501); i.e., zones Z1-Z4. At the end of each of the designated approach zones is a check out-zone (500). Similar to the time-point detection method, in this method the VCU (101) located within the priority vehicle calculates the vehicle's time-distance from a selected intersection (or pre-defined location within the traffic grid). However, in this embodiment a vehicle within the first zone (501), in the embodiment depicted in FIG. 11 the Z4 90-second zone, would send a 90-second ETA to the appropriate priority detector unit (103) (or central server (102) in the centralized embodiment) only if the VCU (101) calculates a 90-second ETA while the vehicle is within the Z4 zone (501). If the vehicle does not achieve a 90-second ETA within Z4, it will transmit its actual calculated ETA call when it reaches the check-out zone (500) at the end of the zone (501). The same process would follow for each successive zone (but each successive zone would be assigned a different ETA time value, such as 60 seconds, 35 seconds or 15 seconds as depicted in FIG. 11). Stated differently, a VCU (101) equipped vehicle will transmit its calculated ETA to the appropriate priority detector unit (103) (or central server (102) in the centralized embodiment) in each respective zone (501) if the assigned ETA value for that zone (501) is achieved within that zone (501) and, regardless of whether the assigned ETA value for that zone is achieved within that zone, when the VCU (101) equipped vehicle reaches the check-out zone (500) within the zone (501). Thus, in this method, ETA signals are sent when a fixed geographic zone is reached (i.e., when a VCU (102) equipped vehicle reaches a check-out zone (500)) and when a certain ETA time point is reached within a certain zone (501) in the approach path. Notably, it should be understood that the orientation and number of zones (501) and the ETA time values proscribed to the zones (501) represented in FIG. 11 are not determinative. The assigned ETA times and the orientation and number of the zones (501) is only exemplary and it should be understood that any times and zone orientation can be specified by a user of the system described herein.

Further, it should be understood that the time-point detection method, the fixed geographic detection method and the hybrid method are not exclusive of each other. Thus, it is contemplated that the ETA system described herein may simultaneously utilize multiple detection methods, or different components of each of these detection methods, in its control of the traffic grid.

In one embodiment, the ETA transmitted in these methods is calculated and determined in the vehicle, not at the priority detector unit (103) or the centralized server (102). In this embodiment, the vehicle's time-distance, or ETA, is determined by the VCU (101) by utilization of an ETA calculation algorithm that takes into account the vehicle's continually changing speed and distance from the intersection. Upon receiving the ETA time-point data, the priority detector unit (103) then updates the intersection signal controller (105) at user defined timed-ETA or position points. The types of ETA calls which can be output by the priority detector unit (103) include "Cancel" calls (for cases where the approaching vehicle turns off the approach street) and "Checkout calls" (when the vehicle reaches the intersection and ETA is no longer applicable). Because these methods consider vehicle speed in their calculations (i.e., the vehicle's ETA is determined by utilization of an ETA calculation algorithm that takes into account the vehicle's continually changing speed both instantly and potentially within a period of history), it can be advantageous in heavy traffic areas with high variability in traffic flows throughout the day. Notably, in other embodiments of the system it is contemplated that a vehicle's ETA will be calculated and determined at the remote traffic control center (102) or the priority detector unit (103) via utilization of a similar ETA calculation algorithm.

In sum, utilizing a vehicle's future ETA at a pre-defined point as the trigger-point for determining the phases of the signal lights at applicable intersections within the grid, the system disclosed herein allows for the adjustment of various signal lights along the path to the ETA point in an efficient manner that keeps the priority vehicle on-time to its end destination with minimal disruption to the traffic grid as a whole. In contrast to the priority systems of the prior art, the disclosed system is not limited to only granting priority to the vehicle at the next light that it is approaching without any correlation to the other signal lights along its path on the grid. Thus, unlike the detection zone systems of the prior art that track a vehicle's ETA from a fixed location, the system disclosed herein reacts to changes in on-street congestion and vehicle approach speeds in real-time. As the traffic volumes fluctuate, so do the positions of ETA time-points. Further, upon receiving the vehicle ETA notifications, the traffic controller (103) preconditions its internal timings in preparation of a VCU-equipped vehicle's arrival at the intersection. The advanced time-points help the signal controller (105) gradually modify the timings to reduce the impact on the intersection while also enabling the intersection to maintain coordination with other intersections along the corridor.

Figure 3:
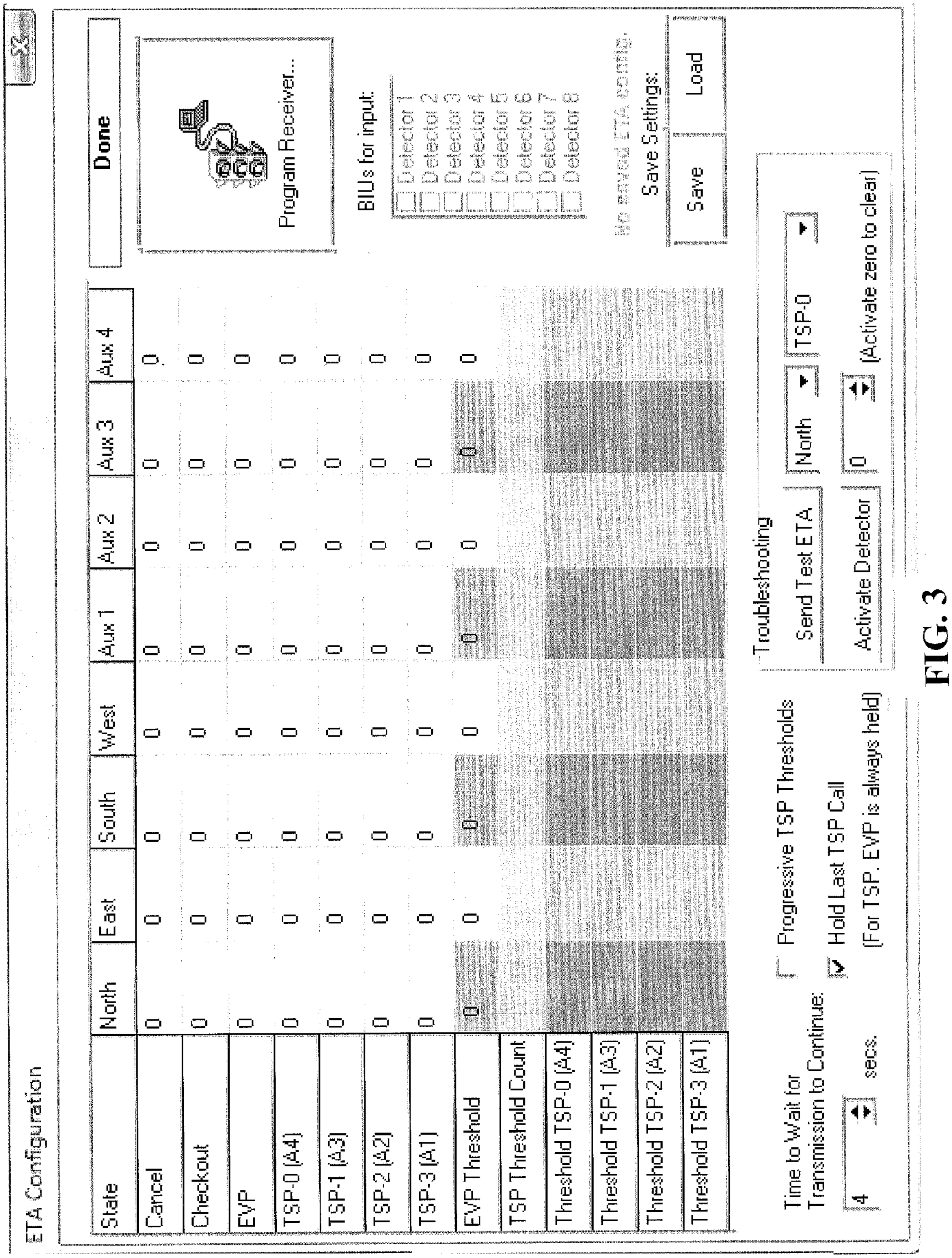
FIG. 3 provides a diagram of an embodiment of an ETA configuration interface output table.

Generally, the ETA time-points are user defined and can be set up to report at any number of time intervals or can be set per-intersection approach in a specifically defined orientation. In one embodiment in which the time-points are user defined, an ETA configuration interface window will be utilized to allow a user to set the time points in which ETA values are to be transmitted to the signal controller (105). An embodiment of this ETA configuration interface output table is depicted in FIG. 3. In the depicted output table of FIG. 3, the values in the top seven rows correspond to the appropriate priority detector unit (103) input channels on the signal controller (102). The remaining rows specify the number of seconds required to carry out the given action or status.

As noted previously, there are a number of different contemplated output calls from the priority detector unit (103) to the signal controller (105). As depicted in FIG. 3, these calls include the cancel call, the checkout call, the EVP call, the TSP (0-3) call and the EVP Threshold call. Generally, the "Cancel" call is the ETA output given when the priority detector unit (103) is notified by the VCU (101) that the vehicle has gone into standby mode. For example, mass transit vehicles may be configured to enter standby mode when a stop is requested or when the doors open. Generally, the parameters that put a vehicle in standby mode are defined in the VCU (101) and may need to be customized based on vehicle connections.

The "Checkout" call is the ETA output given when the vehicle leaves the intersection-approach zone. The intersection approach zone is the defined detection zone preceding a given signal light. Generally, at this point, the vehicle has either "arrived" at the target point (such as the stop or intersection) or has turned off the approach path to the point. In this situation, the vehicle is no longer regulated by the particular priority system to that target ETA point (although it may now be on a different system).

The "EVP" ETA output is generally the output call issued when an equipped emergency vehicle other vehicle that requires an immediate signal light change has entered the intersection-approach zone. In EVP scenarios, the ETA call is generally sent and held until the vehicle checks out of the approach. This allows an emergency vehicle to be given a different priority than a mass transit or other vehicle while still using the same system of vehicle detection in order to simplify signal transmission and better integrate different options.

The TSP (0-3) calls are generally the ETA output calls at the intervals defined in the Threshold TSP fields in the fixed-detection zone model. Typically, TSP-0 is the first call sent, followed in order by the remaining calls. Although this order may be reversed or otherwise altered in accordance with controller settings.

Figure 4:
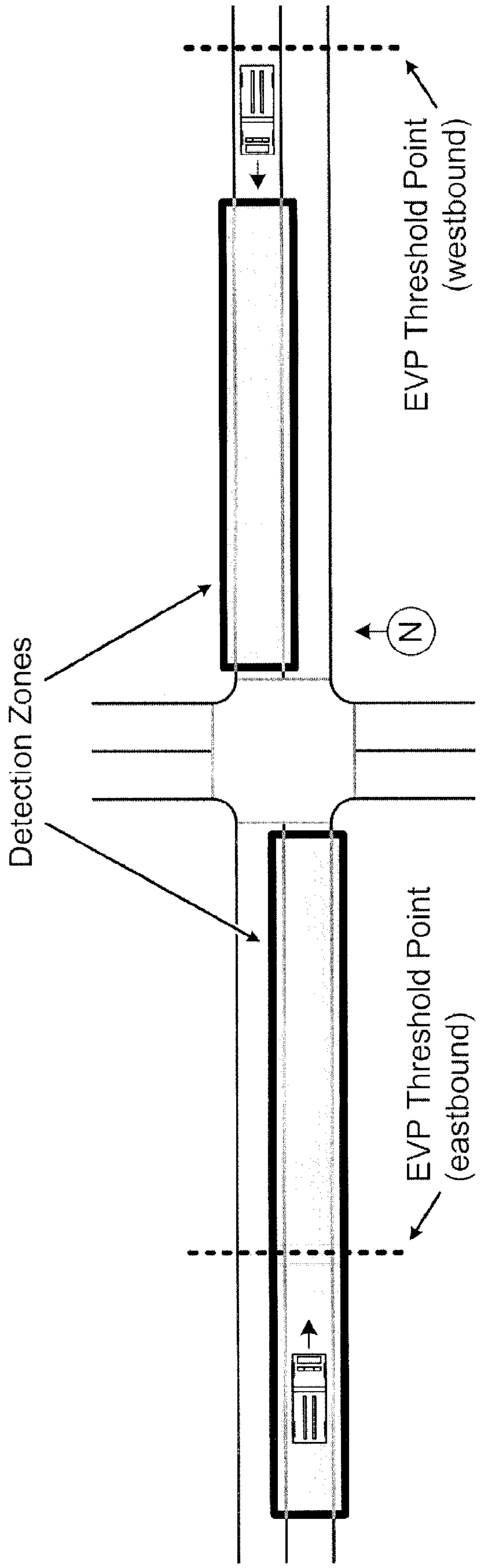
FIG. 4 provides a depiction of different orientations of the EVP thresholds to intersection-approach zones.

The EVP Threshold in the output chart represents the maximum number of seconds at which EVP requests should be sent to the signal controller (105). For example, a "200" in this field would not allow EVP calls to be sent to the signal controller (105) until the vehicle is no more than 200 seconds from the intersection. In one embodiment, it is contemplated that the EVP threshold will be located after the beginning of the intersection-approach zone, as depicted by the eastbound threshold point of FIG. 4. That is, the detection zone is relevant for only the immediately approaching signal. Under these circumstances, the vehicle would not report its ETA until it passed the EVP threshold within the detection zone. In another embodiment, it is contemplated that the EVP threshold would begin well before the approach zone, so the vehicle would report ETA as soon as it enters the approach zone to allow for interface with a number of signals and the pre-established target destination. This orientation of the EVP threshold is depicted in the westbound threshold point of FIG. 4.

The TSP Threshold is the total number of time points at which ETA will be output to the signal controller (105) in the time-point detection method. For example, a "4" in this field enables the priority detector unit (103) to update vehicle ETA status at four time points, for example at 90, 60, 30 and 15 seconds from the intersection. Finally, the Threshold TSP (0-3) in the output chart represents the number of seconds from the intersection at which ETA status is output to the signal controller (105). Typically, TSP-0 is the first call sent, followed in order by the remaining calls, TSP-1, TSP-2 and TSP-3.

In addition to the values entered into the ETA configuration output chart, there are a number of additional potential fields and user input positions in an embodiment of the ETA configuration interface that allow for a user to offer input and instructions into the system. For example, the Time To Wait for Transmission Continue field defines the amount of time the priority detector unit (103) waits before dropping the vehicle's ETA status. For example, if an equipped vehicle turns off the approach street after its first ETA point has been reported, the priority detector unit (103) will drop the vehicle status after four seconds. In most cases, it is not necessary for a user to change or manipulate this field as it is a system for simply clearing unnecessary priority requests.

Another notable field is the Progressive TSP Thresholds field. When this box is selected, ETA time-points that have already been called are not allowed to be called again. For example, if a 30-second ETA has already been called and traffic conditions slow down to the point where it will take over 30 seconds to arrive, the 30 second ETA will not be called again.

The Hold Last TSP Call Field is a field that, when selected, holds the last ETA call (e.g., the Threshold TSP-3 call) until the vehicle leaves the intersection approach. This operates similar to the way in which EVP calls are held as it relates to the final approach to the final signal prior to the destination point. The Send Test ETA controls enable a user to send ETA test calls by vehicle direction and specific call type. These calls are generally sent directly from the priority detector (103).

The Activate Detector field controls enable a user to send a specific detector value for specific controller input channels. For example, if the value used to send TSP-0 calls for a northbound approach is 36, 36 will be input into this field and "activate detector" will be pressed to send that last ETA call. These calls are sent directly from the priority detector unit (103). The Bus Interface Units for input list displays the current status of the Bus Interface Unit detectors (for the connected priority detector units (103)) that have been set up as inputs. Finally, the program receiver field assigns the entered ETA values to the connected priority detector unit (103).

Another signal option for the disclosed system in certain embodiments is a system of conditional transit signal priority. These conditional transit signal priority signals are generally based on the amount of time a VCU-equipped vehicle is behind schedule. To achieve conditional TSP, the system is generally configured to request signal priority only when activated through a connection to the onboard schedule-adherence system. For example, when a VCU-equipped vehicle lags behind schedule by a set amount of time, the schedule-adherence system enables the components of the system to request signal priority for upcoming intersection. If the VCU-equipped vehicle is on schedule, signal priority is not requested, allowing the buses to better maintain headway. Generally, in a conditional priority system, certain user-established pre-conditions must be met before the priority detector unit (103) will send a signal priority request to the signal controller (105). These conditions can be set and modified by the user and controller of the system. Examples of some of the pre-conditions which can be set by a user include, but are not limited to, not sending a signal priority request if: another VCU-equipped vehicle has not requested priority within a specified time frame (for example, eight minutes); the VCU-equipped vehicle doors are closed (i.e., the bus is not at a stop with open doors); or an exit request has not been made for the next stop.

Yet another signal option for the system described herein is automatic vehicle location. This option of the system helps to mitigate the problem of bunching along mass transit routes. To prevent this problematic occurrence, in the automatic vehicle location (AVL) mode both the drivers of the at-risk "bunched" vehicles and the supervisor of the vehicles can be notified and alerted of the potential problem. Then automated (or supervisor-actuated) commands can be issued for the lead bus to operate in express or skip-stop mode until an acceptable gap is reestablished. For example, the lead mass transit vehicle can be granted transit signal priority (to help keep it on schedule) while not granting priority for the trailing bus (to maintain the desired headway amount between the two vehicles). Thus, in this mode, the system only sends TSP requests to a signal controller (105) when pre-defined bunching conditions (such as a specific amount of time behind schedule) have been met. In this mode, the acceptable schedule variances and headway amounts can be determined by the transit agency and programmed into the system at the VCU (101), the remote control center (102), or secondary control centers (106). If further action is required to maintain an identified minimum headway, the central monitoring system at the remote control center (102) will recognize the reduced headway amount and will notify personnel at central locations who can respond accordingly (for example, by authorizing skip-stop mode for the leading mass-transit vehicle).

When used in conjunction with TSP, this mode is capable of protecting transfers and supporting schedule adherence for mass transit vehicles in the event of the non-recurring obstacles to normal transit operations which often lead to bunching such as road construction, traffic accidents, weather, double-parked vehicles, special-event travel demand, wheelchair lift use and so forth. Thus, in sum, the system in this mode allows for: transit vehicles to request signal priority when defined headway limits are reached, making schedule adherence easier to achieve; negative trends (such as reduced headway amounts) to be recognized by the system, allowing for automatic notifications to be set up to alert dispatchers when predefined trend rates or thresholds are reached; allowing vehicles and dispatchers to perform multiple actions (such as enabling TSP or enacting skip-stop modes) to reestablish headway amounts; and allowing for monitoring personnel to view headway amounts for all vehicles, thus enabling them to identify and troubleshoot issues from a centralized location.

Another contemplated feature of the disclosed system, in certain embodiments, is the monitoring of VCU-equipped vehicle activity and the creation of logs for this activity. It is contemplated, depending on the embodiment, that these logs may be viewed at the remote central control center (102), through a user interface location in the equipped-vehicle, or at the secondary central control centers (106). In one embodiment, this log creation will occur in real-time via transfer of the vehicle activity data through the network to the remote central control center (102) or a secondary control center (106). In some embodiments, it is contemplated that the downloaded logs will be saved on the remote central control center server (102) and will be accessible from other networked workstations and by authorized personnel via e-mail or some other data sharing service known to those of ordinary skill in the art.

Figure 8:
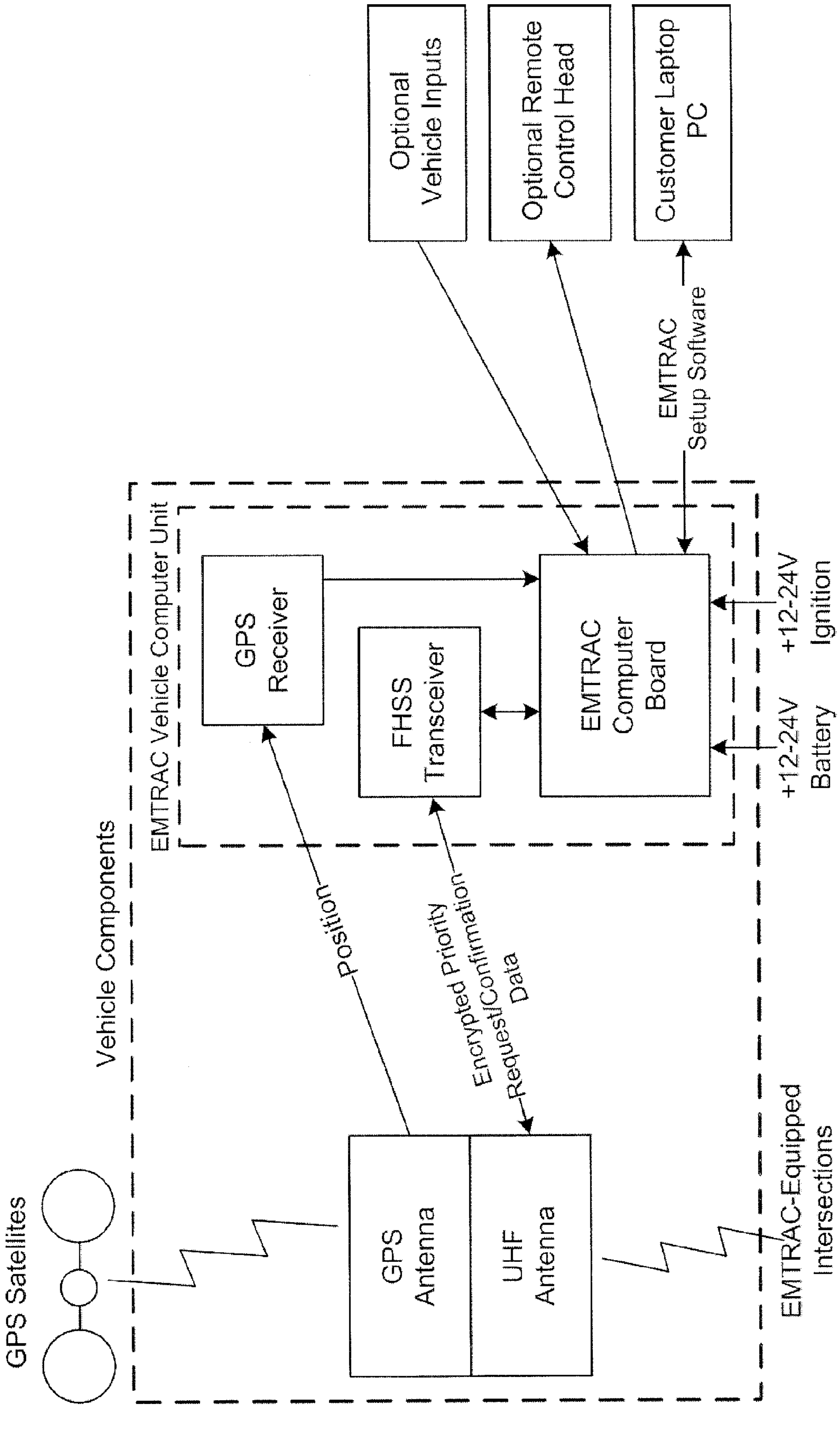
FIG. 8 provides another block diagram of the components of the disclosed traffic light ETA priority system, particularly the vehicle components.

In the embodiment of the ETA traffic control system in which the system is centralized, the communication and information exchange between the components of the disclosed ETA traffic control system generally functions as follows. The GPS receiver of the VCU (101) located in the mass transit vehicle, through inputs received from an applicable satellite system, determines the speed, direction, velocity and other pertinent geographic and coordinate information for the vehicle in all monitored approaches. This communication chain is depicted in the block diagrams of FIGS. 8 and 9. Then, either constantly or at fixed time intervals, the VCU (101) transmits either the raw applicable geographic and coordinate information for the vehicle or the pre-calculated ETA arrival time to the remote traffic control center (102), as seen in FIG. 8. Next, the remote traffic control center (102) transmits this data to the applicable priority detector units (103) in the traffic grid.

In this way, the centralized system allows for a robust Automatic Vehicle Location (AVL) system that enables monitoring personnel to track vehicle activity in real time while vehicle locations are displayed on integrated maps. Thus, users of the system can designate key events to trigger alarms to notify workers at central locations of certain events. This ability to monitor equipped-vehicle activity and automatically detect driver violations provides a way for traffic grid supervisors to increase safety while holding mass transit operators accountable for running through stop signals (or other identified violations of the traffic grid). It is also contemplated, in certain embodiments, that this AVL interface and monitoring system will also be available in certain embodiments of the localized system. In these embodiments, a user interface in the vehicle itself can allow for real-time monitoring of equipped-vehicles in the grid.

In the embodiment of the centralized ETA traffic control system in which only the coordinates are sent from the VCU (101) to the remote traffic control center (102), once the coordinate information is received at the remote traffic control center (102), the remote traffic control center (102), based upon the received coordinates, information regarding the schedule of the mass transit system, and information regarding each of the traffic light signals in the system, determines if the ETA for the mass transit vehicle at the next stop or waypoint is on its schedule. In one embodiment, this transmission of coordinate information will be constant as long as the vehicle is within the applicable range. The remote traffic control center (102) then determines whether the mass transit vehicle is ahead, on, or behind schedule. If the mass transit vehicle is on schedule, in one embodiment of the system no further action will be taken other than continued monitoring. If the mass transit vehicle is on schedule, the system will still determine, based on other inputs into the system (such as inputs from other mass transit vehicles traveling in the grid) if a future delay on the vehicle's scheduled route is likely. If the mass transit vehicle is behind schedule, the remote traffic control center (102) will determine which phases of which traffic signal in the system need to be modified, and in what fashion they need to be modified, to attempt to get the mass transit vehicle back onto schedule with the least amount of disruption to the overall traffic flow. Alternatively, the system may allow another mass transit vehicle that is behind schedule to get on schedule at the expense of one moving ahead of schedule. Once the corrective action determination is made at the remote traffic control center (102), phase change signals are sent from the remote traffic control center (102) to the respective priority detectors (103). These phase change signals are then sent from the priority detector units (103) to the signal controllers (105) to modify the traffic light phases of the respective intersection in the manner necessary to get the mass transit vehicle back onto schedule.

The priority controller based system, where there is no central control, will generally operate along similar lines. However, the determination of which lights to alter is generally made at each individual signal and the signals may prepare for an alteration that is not implemented because it is no longer necessary based on what other signals have already done. In a still further embodiment, only the last signal will assume any priority adjustment is necessary, and will prepare for that adjustment, adapting the specifics of it as information becomes available from the vehicle reaching different ETAs from interaction with prior signals. A system whereby the signals make independent decisions is generally preferred if there is no central control grid system (and thus no universal system to be disrupted) and where the individual signals each make their own determinations already. For example, if a light will only turn red when a vehicle is detected at a particular cross street (and will do so very quickly), the detection of both the vehicle in the cross street and a behind schedule mass transit vehicle on the main street, can result in the signal delaying the cross street traffic to avoid hampering the mass transit vehicle further.

Notably, in both the vehicle-centered and centralized embodiments of this system, the traffic signals generally will continue to display normal sequences from green to yellow to red. What is often modified in the present systems is the period of time each sequence or phase is displayed. For example, if the overall system determines that the mass transit vehicle needs to hit a red light at traffic light A and a green light at traffic light B in order to get back on schedule without disrupting the traffic flow, even if this actually delays the vehicle further at light A, the priority detectors (103) at each of the traffic lights will receive signals from the remote traffic control center (102) commanding them to adjust the phases at each of their traffic lights in such a manner. As such, the present ETA traffic control system controls the phases of the traffic lights in the system based on the movement of equipped mass transit vehicles in the control grid, modifying the phases of each of the traffic lights in the system in order to ensure that each of the mass transit vehicles reaches each of its scheduled stops essentially on time.

Figure 9:
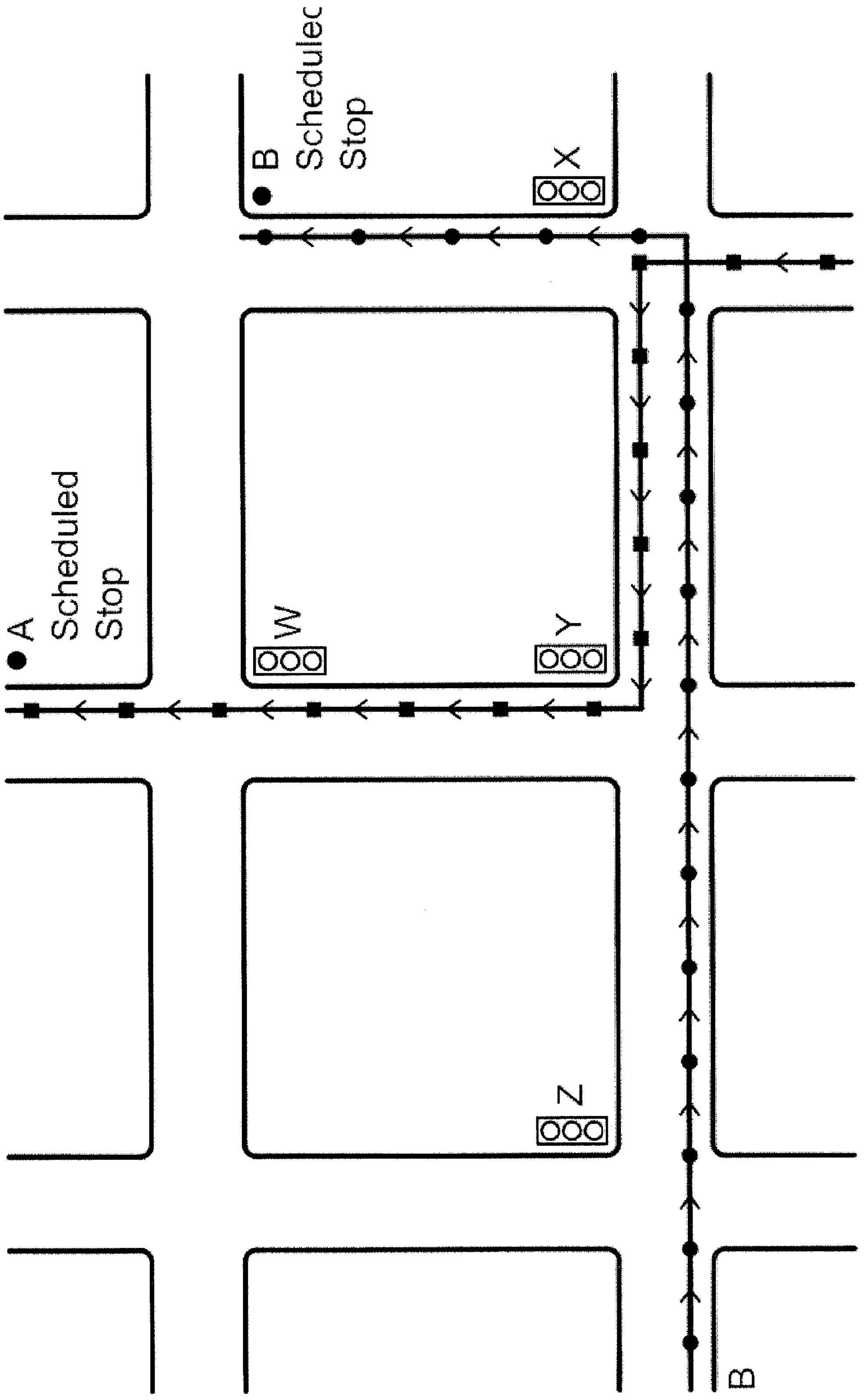
FIG. 9 provides a hypothetical example of how the disclosed system works in practice to modify the phases of the traffic lights within the grid in order to keep multiple mass transit vehicles on schedule.

The following offers an example of how the disclosed system would be utilized in the embodiment which utilizes a remote traffic control center and the impact it would have on the overall traffic patterns of the grid it controls. As depicted in FIG. 9, in this hypothetical example, there are two mass transit vehicles: vehicle A and vehicle B. Both vehicle A and vehicle B have specific scheduled routes. Both vehicle A and vehicle B have to travel through 3 traffic light intersections before they reach their next scheduled stop. In this hypothetical example, the coordinate information for vehicle A and vehicle B is received at the remote traffic control center (102) from each vehicle's respective VCU (101). Then, the remote traffic control center (102), based upon the received coordinates, information regarding the schedule of the mass transit system, and information regarding each of the traffic light signals in the system, determines the ETA for each of the mass transit vehicles at the next stop on their respective schedules.

In this hypothetical, the remote traffic control center (102) determines that the ETA for vehicle A is three minutes ahead of schedule and the ETA for vehicle B is two minutes behind schedule. From the information regarding the maps of the routes in the grid, the system is able to determine that the routes of vehicle A and vehicle B overlap for two traffic lights. Further, from the information regarding the traffic light signals in the system, the remote traffic control center (102) is able to determine that the default phase change timing for each of the traffic lights in the grid. From this information, the remote traffic control center (102) is able to determine in what manner the phases of the traffic lights in the grid need to be modified in order to get both vehicle A and vehicle B vehicle back onto schedule.

Further, in this hypothetical, the system determines that if it alters the phases of lights Z, Y and X to allow for vehicle B to travel through these intersections without incurring a red light, vehicle B will get back onto schedule. The system also determines that if it lets vehicle A turn left at traffic light X and holds vehicle A at traffic light Y with a red light (until vehicle B travels by) vehicle A will no longer be ahead of schedule (but will still be on schedule) while vehicle B can still go through light X on green as vehicle A has cleared the intersection before it needs to change. Thus, this pattern is implemented by the system as the best methodology to maintain schedules.

In a system without central control, light Z would generally give priority to vehicle B to help it get back on schedule making sure it had a green light. Light X may do nothing for vehicle A as it is ahead of schedule and does not need priority treatment. As these actions could alter the relative ETA of the vehicles, Light Y may take into account both approaching vehicles and any ETA change based on the effects of lights X or Z (for instance if A is now behind schedule because it did not get to turn at light X without waiting or if A is still ahead and B is still behind). It can then determine that A should be allowed to turn before B can go straight (or visa versa) depending on the impact on each vehicle. This determination may also take into account the possibility that the later light (W or X) of the appropriate vehicle (A or B) can assist to get them back on schedule if the current light Y action results in a delay to one of them.

As demonstrated by this example and the description offered above, ETA traffic control system allows for the free transmission of signals and information between and among the components of the system. Among other functions, this allows for the: 1) configuring of the priority detectors (103) remotely without traveling to each intersection to connect directly to the detectors (103); 2) retrieving of activity logs remotely; 3) monitoring of the specific priority detector (103) activity from the remote traffic control center (102) (in the embodiment in which the system is centralized); 4) remote monitoring of the priority detectors (103) to verify they are working properly; and 5) the connecting of vehicle computer units (101) to laptop computers for system set-up or log retrieval (as depicted in FIG. 8).

Further, in the centralized embodiment of the system, the remote traffic control center (102) generally functions to: 1) receive coordinate data from each of the respective vehicle equipment units (101) in the system; 2) store data and information related to the schedules of mass transit vehicles in the system; 3) store data regarding the location and default phase systems of each of the traffic lights in the system; 4) determine the ETA for each mass transit vehicle in the system at designated points along its scheduled route dependent upon the GPS coordinate data received; 5) determine how the phases of the traffic lights in the system need to be changed or manipulated in order to keep a mass transit vehicle on its defined schedule; and 6) modify the phases of the traffic lights in the system by sending priority control signals to the priority detectors (103) in the system to modify the phases in order to keep mass transit vehicles in the system on schedule.

In sum, in the disclosed system the phases of the traffic lights in the grid are controlled and modified in accordance to the coordinates and ETA calculations of the mass transit vehicles traveling in the grid or otherwise traveling through a predetermined route on a schedule. Thus, the focus is on the efficient and smooth operation of traffic flows in a series of signal lights to a later defined point related to a vehicle's route or in the entire grid system, not simply giving priority to a particular privileged vehicle that comes into a detection zone preceding a specific signal light (although such systems can operate in conjunction with the systems here, and can also utilize the ETA calculation as part of the priority determination). Accordingly, the benefits of the ETA system can be numerous.

First, ease of installation. The ETA traffic control system handles EVP, TSP and ETA seamlessly and without the requirement of major additional equipment. Thus, the ETA traffic control system can coexist with currently implemented systems without disrupting priority response for emergency vehicles or signal coordination for efficient current grid flow. Second, reliability. Wireless communication is generally not hampered by adverse weather conditions and is not limited to clear line-of-sight paths. Further, the location and activity data in the system is sent through secure radio channels and secure Ethernet connections. Third, flexibility. The agencies can reconfigure the system as needed. System edits may include (but are not limited to): time-point changes per-intersection approach, detection-zone settings for specific vehicles (to allow for route changes), and vehicle priority levels, amongst other things. The system also allows for different headway amounts (and acceptable variances) to be assigned along different paths of the corridor and for different routes. Fourth, precision and accuracy. Dead reckoning capability in conjunction with GPS provides continuous vehicle-position accuracy even in unfavorable urban environments. Fifth, timeliness. Vehicle positions in the system are updated on the map either in the vehicle, at the remote central control center or at secondary control centers very quickly. This enables dispatchers to proactively respond to potential issues quickly. Finally, the ETA traffic control system disclosed herein will improve schedule adherence by requesting priority only when specific conditions are met.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A system for requesting modification of signal light control of a traffic grid, the system comprising:

a vehicle computer unit, wherein the vehicle computer unit is installed in a vehicle and functions to determine the vehicle's position, direction, and velocity;

a plurality of priority detector units, wherein each priority detector unit is communicatively attached to a signal light controller within the traffic grid; and a wireless network connecting the vehicle computer unit and the plurality of priority detector units;

wherein the vehicle computer unit uses the vehicle's position, direction and velocity to calculate the vehicle's estimated time of arrival to a signal light within the traffic grid and sends the vehicle's estimated time of arrival to the signal light to a priority detector unit communicatively attached to a signal light controller associated with the signal light; and wherein the priority detector unit communicatively attached to the signal light controller associated with the signal light receives the vehicle's estimated time of arrival and requests modification of the signal light controller associated with the signal light based on the vehicle's estimated time of arrival.

2. The system of claim 1, the system further comprising:

a remote traffic control center, wherein the remote traffic control center is communicatively attached to the wireless network; and wherein the vehicle computer unit transmits information chosen from the group consisting of the vehicle's position, direction, velocity and estimated time of arrival to the remote traffic control center; and wherein the remote traffic control center determines which signal light controllers within the traffic grid need to be modified to keep the vehicle on schedule; and wherein the remote traffic control center sends a signal to one or more of the plurality of priority detector units to request modification of an associated signal light controllers based on the vehicle's estimated time of arrival.

3. The system of claim 1, wherein the vehicle computer unit sends the vehicle's estimated time of arrival to the signal light to the priority detector unit communicatively attached to the signal light controller associated with the signal light at a plurality of advanced detection zones preceding the signal light.

4. The system of claim 3, wherein the location of the advanced detection zones in the traffic grid can be modified by a user.

5. The system of claim 1, wherein the vehicle computer unit sends its estimated time of arrival to the priority detector unit communicatively attached to the signal light controller associated with the signal light at pre-defined periods of time; and wherein the priority detector unit communicatively attached to the signal light controller associated with the signal light receives the vehicle's estimated time of arrival and requests modification of the signal light controller associated with the signal light at pre-defined periods of time based on the vehicle's estimated time of arrival.

6. The system of claim 5, wherein the pre-defined periods of time can be modified by a user.

7. The system of claim 1, wherein the vehicle computer unit sends the vehicle's estimated time of arrival to the signal light to the priority detector unit communicatively attached to the signal light controller associated with the signal light at a plurality of advanced detection zones if the vehicle reached a certain pre-defined estimated time of arrival to the signal light while the vehicle is within the advanced detection zone; and wherein the vehicle computer unit sends its estimated time of arrival to the signal light to the priority detector associated with the signal light at a check out zone within each of the plurality of advanced detection zones.

8. The system of claim 7, wherein the vehicle is a mass transit vehicle.

9. A system for requesting modification of signal light control of a traffic grid, the system comprising:

a vehicle computer unit, wherein the vehicle computer unit is installed in a vehicle and functions to determine the vehicle's position, direction, and velocity;

a plurality of priority detector units, wherein each priority detector unit is communicatively attached to a signal light controller within the traffic grid; and a wireless network connecting the vehicle computer unit and the plurality of priority detector units;

wherein the vehicle computer unit transmits information chosen from the group consisting of the vehicle's position, direction, velocity to at least one priority detector unit; and wherein the at least one priority detector unit receives the information and calculates the vehicle's estimated time of arrival to a signal light within the traffic grid associated with the at least one priority detector unit; and wherein the at least one priority detector unit is communicatively attached to a signal light controller associated with the signal light and sends a signal to request modification of the signal light controller associated with the signal light based on the vehicle's estimated time of arrival.

10. The system of claim 9, wherein the vehicle is a mass transit vehicle.

11. A system for requesting modification of signal light control of a traffic grid, the system comprising:

a vehicle computer unit, wherein the vehicle computer unit is installed in a vehicle and functions to determine the vehicle's position, direction, and velocity;

a plurality of priority detector units, wherein each priority detector unit is communicatively attached to a signal light controller within the traffic grid;

a wireless network connecting the vehicle computer unit and the plurality of priority detector units; and a remote traffic control center, wherein the remote traffic control center is communicatively attached to the wireless network;

wherein the vehicle computer unit transmits information chosen from the group consisting of the vehicle's position, direction, velocity to the remote traffic control center; and wherein the remote traffic control center receives the information and calculates the vehicle's estimated time of arrival to a signal light within the traffic grid;

wherein the remote traffic control center sends a signal to one or more of the plurality of priority detector units requesting modification of an associated signal light controller based on the vehicle's estimated time of arrival.

12. The system of claim 11, wherein the vehicle is a mass transit vehicle.

* * * * *